United States Patent
Han et al.

(10) Patent No.: US 11,659,163 B2
(45) Date of Patent: May 23, 2023

(54) VIDEO ENCODING/DECODING METHOD AND DEVICE

(71) Applicant: INDUSTRY ACADEMY COOPERATION FOUNDATION OF SEJONG UNIVERSITY, Seoul (KR)

(72) Inventors: Jong Ki Han, Seoul (KR); Sang Guk Cha, Seoul (KR); Geon Won Lee, Seoul (KR); Geun Bae Kim, Incheon (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 17/285,336

(22) PCT Filed: Dec. 11, 2019

(86) PCT No.: PCT/KR2019/017479
§ 371 (c)(1),
(2) Date: Apr. 14, 2021

(87) PCT Pub. No.: WO2020/130477
PCT Pub. Date: Jun. 25, 2020

(65) Prior Publication Data
US 2021/0385435 A1    Dec. 9, 2021

(30) Foreign Application Priority Data

Dec. 17, 2018    (KR) .................. 10-2018-0163526

(51) Int. Cl.
*H04N 19/159*    (2014.01)
*H04N 19/105*    (2014.01)
(Continued)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
CPC .. H04N 19/105; H04N 19/159; H04N 19/176; H04N 19/46
See application file for complete search history.

(56) References Cited

U.S. PATENT DOCUMENTS

2018/0103251 A1    4/2018  Lin et al.
2020/0404302 A1*  12/2020  Heo ........................ H04N 19/44
2021/0195239 A1*   6/2021  Kim ...................... H04N 19/186

FOREIGN PATENT DOCUMENTS

JP        2018-174569 A    11/2018
KR    10-2014-0098113 A     8/2014
(Continued)

OTHER PUBLICATIONS

Seregin, Vadim et al., "Neighbor based intra most probable modes list derivation", Joint Video Exploration Team (JVET) of ITU-T SG 16 WP 3 and ISO/IEC JTC 1/SC 29/WG 11,3rd Meeting, Geneva, Switzerland, May 26-Jun. 1, 2016 (pp. 1-4).
(Continued)

*Primary Examiner* — Dave Czekaj
*Assistant Examiner* — Berteau Joisil
(74) *Attorney, Agent, or Firm* — NSIP Law

(57) ABSTRACT

A video encoding/decoding device according to the present invention may determine an intra prediction mode of a current block on the basis of a most probable mode (MPM) of the current block or an intra prediction mode of a neighboring block, determine a reference region for intra prediction of the current block, and perform intra prediction on the current block by using the intra prediction mode and the reference region.

10 Claims, 7 Drawing Sheets

(51) Int. Cl.
*H04N 19/176* (2014.01)
*H04N 19/46* (2014.01)

(56) References Cited

FOREIGN PATENT DOCUMENTS

KR          10-1735137  B1    5/2017
KR     10-2018-0123674  A    11/2018

OTHER PUBLICATIONS

Korean Office Action dated May 27, 2021 in counterpart Korean Patent Application No. 10-2019-0165302 (4 pages in Korean).
International Search Report dated Mar. 17, 2020 in counterpart International Patent Application No. PCT/KR2019/017479 (2 pages in English and 2 pages in Korean).

* cited by examiner

FIG. 6

| 0 | 1 | 2 | 3 | 4 | ... ... ... | 55 | 56 | X | X | X | X | | | |

Second candidate group configured with 4 candidate modes

| 0 | 1 | 2 | 3 | 4 | ... ... ... | 55 | X | X | X | X | X | | | |

Second candidate group configured with 5 candidate modes

VIDEO ENCODING/DECODING METHOD AND DEVICE

CROSS REFERENCE TO RELATED APPLICATIONS

This application is a U.S. National Stage Application of International Application No. PCT/KR2019/017479, filed on Dec. 11, 2019, which claims the benefit under 35 USC 119(a) and 365(b) of Korean Patent Application No. 10-2018-0163526, filed on Dec. 17, 2018, in the Korean Intellectual Property Office, the entire disclosure of which is incorporated herein by reference for all purposes.

TECHNICAL FIELD

The present disclosure relates to a method and a device of encoding/decoding a video signal.

BACKGROUND ART

The demands for high-resolution and high-quality images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

DISCLOSURE

Technical Problem

The present disclosure is to improve encoding/decoding efficiency of intra prediction.

The present disclosure is to improve encoding/decoding efficiency of an intra prediction mode.

Technical Solution

A video signal decoding method and device according to the present disclosure may obtain a flag from a bitstream, determine a candidate group on an intra prediction mode of the current block based on the flag, derive an intra prediction mode of the current block based on the determined candidate group and perform intra prediction for the current block based on the derived intra prediction mode and a predetermined reference region.

In a video signal decoding method and device according to the present disclosure, the flag may indicate a predetermined candidate group used to derive an intra prediction mode of a current block.

In a video signal decoding method and device according to the present disclosure, the candidate group may be determined as a first candidate group or a second candidate group, the first candidate group may be configured with a default mode and the second candidate group may be configured by using an intra prediction mode of a neighboring block adjacent to the current block.

In a video signal decoding method and device according to the present disclosure, the default mode may include at least one of a DC mode or a Planar mode.

In a video signal decoding method and device according to the present disclosure, at least one candidate mode belonging to the second candidate group may be derived by adding or subtracting a value of n to or from an intra prediction mode of the neighboring block and n may be a natural number greater than or equal to 2.

In a video signal decoding method and device according to the present disclosure, the number of candidate modes belonging to the second candidate group may be m and m may be a natural number such as 1, 2, 3, 4, 5, 6, or more.

In a video signal decoding method and device according to the present disclosure, the second candidate group may not include a default mode included in the first candidate group.

A video signal encoding method and device according to the present disclosure may determine an intra prediction mode of a current block, encode a flag for indicating a candidate group to which an intra prediction mode of the current block belongs and perform intra prediction for the current block based on an intra prediction mode of the current block and a predetermined reference region.

In a video signal encoding method and device according to the present disclosure, the candidate group may include at least one of a first candidate group or a second candidate group, the first candidate group may be configured with a default mode and the second candidate group may be configured by using an intra prediction mode of a neighboring block adjacent to the current block.

In a video signal encoding method and device according to the present disclosure, the default mode may include at least one of a DC mode or a Planar mode.

In a video signal encoding method and device according to the present disclosure, at least one candidate mode belonging to the second candidate group may be derived by adding or subtracting a value of n to or from an intra prediction mode of the neighboring block and n may be a natural number greater than or equal to 2.

In a video signal encoding method and device according to the present disclosure, the number of candidate modes belonging to the second candidate group may be m and m may be a natural number such as 1, 2, 3, 4, 5, 6, or more.

In a video signal encoding method and device according to the present disclosure, the second candidate group may not include a default mode included in the first candidate group.

A computer-readable recording medium according to the present disclosure may include a data stream including encoding information encoded by intra prediction of a current block, the encoding information may include a flag indicating a candidate group used to derive an intra prediction mode of the current block and a candidate group on an intra prediction mode of the current block may be determined as any one of a first candidate group or a second candidate group according to the flag.

In a computer-readable recording medium according to the present disclosure, the first candidate group may be configured with a default mode and the second candidate group may be configured by using an intra prediction mode of a neighboring block adjacent to the current block.

In a computer-readable recording medium according to the present disclosure, the default mode may include at least one of a DC mode or a Planar mode.

In a computer-readable recording medium according to the present disclosure, at least one candidate mode belonging to the second candidate group may be derived by adding or subtracting a value of n to or from an intra prediction mode of the neighboring block and n may be a natural number greater than or equal to 2.

In a computer-readable recording medium according to the present disclosure, the number of candidate modes belonging to the second candidate group may be m and m may be a natural number such as 1, 2, 3, 4, 5, 6, or more.

In a computer-readable recording medium according to the present disclosure, the second candidate group may not include a default mode included in the first candidate group.

Advantageous Effects

According to the present disclosure, encoding/decoding efficiency of an intra prediction mode may be improved by selectively using any one of a plurality of candidate groups.

In addition, according to the present disclosure, encoding/decoding efficiency of an intra prediction mode may be improved by reducing the number of non-MPMs or changing arrangement of non-MPMs.

In addition, according to the present disclosure, encoding/decoding efficiency of intra prediction may be improved by determining a predetermined reference region for intra prediction.

DESCRIPTION OF DRAWINGS

FIG. 6 relates to a method in which remaining mode information is encoded/decoded based on removal of a second candidate group as an embodiment to which the present disclosure is applied.

BEST MODE

Figure 1:
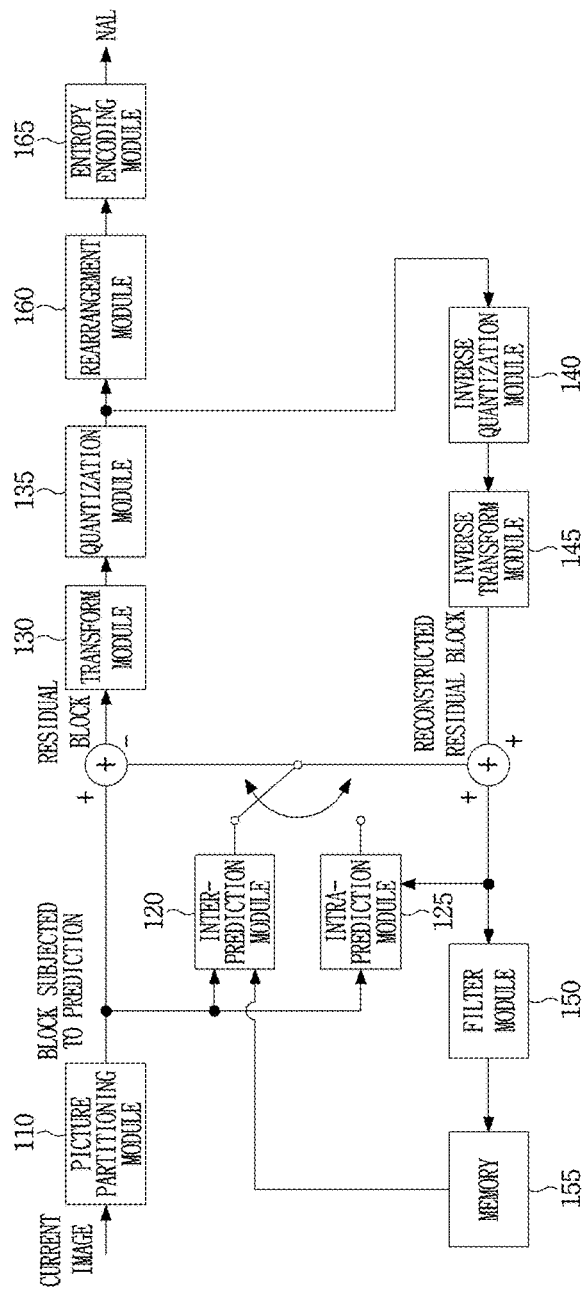
FIG. 1 shows a rough block diagram of an encoding device as an embodiment of the present disclosure.

A video signal decoding method and device according to the present disclosure may obtain a flag from a bitstream, determine a candidate group on an intra prediction mode of the current block based on the flag, derive an intra prediction mode of the current block based on the determined candidate group and perform intra prediction for the current block based on the derived intra prediction mode and a predetermined reference region.

In a video signal decoding method and device according to the present disclosure, the flag may indicate a predetermined candidate group used to derive an intra prediction mode of a current block.

In a video signal decoding method and device according to the present disclosure, the candidate group may be determined as a first candidate group or a second candidate group, the first candidate group may be configured with a default mode and the second candidate group may be configured by using an intra prediction mode of a neighboring block adjacent to the current block.

In a video signal decoding method and device according to the present disclosure, the default mode may include at least one of a DC mode or a Planar mode.

In a video signal decoding method and device according to the present disclosure, at least one candidate mode belonging to the second candidate group may be derived by adding or subtracting a value of n to or from an intra prediction mode of the neighboring block and n may be a natural number greater than or equal to 2.

In a video signal decoding method and device according to the present disclosure, the number of candidate modes belonging to the second candidate group may be m and m may be a natural number such as 1, 2, 3, 4, 5, 6, or more.

In a video signal decoding method and device according to the present disclosure, the second candidate group may not include a default mode included in the first candidate group.

A video signal encoding method and device according to the present disclosure may determine an intra prediction mode of a current block, encode a flag for indicating a candidate group to which an intra prediction mode of the current block belongs and perform intra prediction for the current block based on an intra prediction mode of the current block and a predetermined reference region.

In a video signal encoding method and device according to the present disclosure, the candidate group may include at least one of a first candidate group or a second candidate group, the first candidate group may be configured with a default mode and the second candidate group may be configured by using an intra prediction mode of a neighboring block adjacent to the current block.

In a video signal encoding method and device according to the present disclosure, the default mode may include at least one of a DC mode or a Planar mode.

In a video signal encoding method and device according to the present disclosure, at least one candidate mode belonging to the second candidate group may be derived by adding or subtracting a value of n to or from an intra prediction mode of the neighboring block and n may be a natural number greater than or equal to 2.

In a video signal encoding method and device according to the present disclosure, the number of candidate modes belonging to the second candidate group may be m and m may be a natural number such as 1, 2, 3, 4, 5, 6, or more.

In a video signal encoding method and device according to the present disclosure, the second candidate group may not include a default mode included in the first candidate group.

A computer-readable recording medium according to the present disclosure may include a data stream including encoding information encoded by intra prediction of a current block, but the encoding information may include a flag indicating a candidate group used to derive an intra prediction mode of the current block and a candidate group on an intra prediction mode of the current block may be determined as any one of a first candidate group or a second candidate group according to the flag.

In a computer-readable recording medium according to the present disclosure, the first candidate group may be configured with a default mode and the second candidate group may be configured by using an intra prediction mode of a neighboring block adjacent to the current block.

In a computer-readable recording medium according to the present disclosure, the default mode may include at least one of a DC mode or a Planar mode.

In a computer-readable recording medium according to the present disclosure, at least one candidate mode belonging to the second candidate group may be derived by adding or subtracting a value of n to or from an intra prediction mode of the neighboring block and n may be a natural number greater than or equal to 2.

In a computer-readable recording medium according to the present disclosure, the number of candidate modes belonging to the second candidate group may be m and m may be a natural number such as 1, 2, 3, 4, 5, 6, or more.

In a computer-readable recording medium according to the present disclosure, the second candidate group may not include a default mode included in the first candidate group.

MODE FOR INVENTION

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical range of the present disclosure. A similar reference sign is used for a similar component while explaining each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As terms used in this application are only used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, stages, motions, components, parts or their combinations entered in a specification, but is not to exclude the existence or possibility of addition of one or more other characteristics, numbers, stages, motions, components, parts or their combinations in advance.

Hereinafter, referring to the attached drawings, a desirable embodiment of the present disclosure will be described in more detail. Hereinafter, the same reference sign is used for the same component in a drawing and an overlapping description for the same component is omitted.

FIG. 1 shows a rough block diagram of an encoding device as an embodiment of the present disclosure.

In reference to FIG. 1, an encoding device 100 may include a picture partition unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

As each construction unit shown in FIG. 1 is independently shown to represent different characteristic functions in a video encoding device, it may mean that each construction unit is configured with a separated hardware. But, as each construction unit is included by being enumerated as each construction unit for convenience of description, at least two construction units among each construction unit may be combined to configure one construction unit or one construction unit may be divided into a plurality of construction units to perform a function and such an integrated embodiment and separated embodiment of each construction unit are also included in a scope of a right of the present disclosure as long as they are not beyond the essence of the present disclosure.

In addition, some components may be just a selective component for improving performance, not an essential component performing an essential function in the present disclosure. The present disclosure may be implemented by including only a construction unit necessary for embodying the essence of the present disclosure excluding a component used only for performance improvement and a structure including only an essential component excluding a selective component used only for performance improvement is also included in a scope of a right of the present disclosure.

A picture partition unit 110 may partition an input picture into at least one block. In this case, a block may mean a coding unit (CU), a prediction unit (PU) or a transform unit (TU). The coding unit (CU) may be set the same as a prediction unit (PU) and/or a transform unit (TU). Alternatively, one coding unit (CU) may be partitioned into a plurality of prediction units (PU) or transform units (TU). One prediction unit (PU) may be partitioned into/configured with a plurality of transform units (TU). Conversely, one transform unit (TU) may be partitioned into/configured with a plurality of prediction units (PU).

The partitioning may be performed based on at least one of quad tree, binary tree or triple tree. Quad tree is a method in which a higher block is partitioned into 4 lower blocks that a width and a height are half of a higher block. Binary tree is a method in which a higher block is partitioned into 2 lower blocks that any one of a width or a height is half of a higher block. In binary tree, a block may have a non-square shape as well as a square shape through the above-described binary tree-based partitioning.

Hereinafter, in an embodiment of the present disclosure, a coding unit may be used as a unit performing encoding or may be used as a unit performing decoding.

A prediction unit 120 and 125 may include an inter prediction unit 120 performing inter prediction and an intra prediction unit 125 performing intra prediction. Whether to perform inter prediction or intra prediction for a prediction unit may be determined and concrete information (e.g., an intra prediction mode, a motion vector, a reference picture, etc.) according to each prediction method may be determined. In this case, a processing unit that prediction is performed may be different from a processing unit that a prediction method and concrete contents are determined. For example, a prediction method, a prediction mode, etc. may be determined in a prediction unit and prediction may be performed in a transform unit. A residual value (a residual block) between a generated prediction block and an original block may be input into a transform unit 130. In addition, prediction mode information, motion vector information, etc. used for prediction may be encoded in an entropy encoding unit 165 together with a residual value and transmitted to a decoding device. When a specific encoding mode is used, it is possible to encode an original block as it is and transmit it to a decoding unit without generating a prediction block through a prediction unit 120 and 125.

An inter prediction unit 120 may predict a prediction unit based on information of at least one picture of a previous picture or a subsequent picture of a current picture or may predict a prediction unit based on information of some regions which have been encoded in a current picture in some cases. An inter prediction unit 120 may include a reference picture interpolation unit, a motion prediction unit and a motion compensation unit.

In a reference picture interpolation unit, reference picture information may be provided from a memory 155 and pixel information equal to or less than an integer pixel may be generated in a reference picture. For a luma pixel, a DCT-based 8-tap interpolation filter with different filter coefficients may be used to generate pixel information equal to or less than an integer pixel in a ¼ pixel unit. For a chroma signal, a DCT-based 4-tap interpolation filter with different filter coefficients may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS(New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. As a motion prediction method, various methods such as a skip method, a merge method, an AMVP (Advanced Motion Vector Prediction) method, etc. may be used.

An intra prediction unit 125 may generate a prediction unit based on reference pixel information around a current block that is pixel information in a current picture. When a reference pixel is a pixel which performs inter prediction as a peripheral block of a current prediction unit is a block which performs inter prediction, a reference pixel included in a block which performs inter prediction may be used by being substituted with reference pixel information of a peripheral block which performs intra prediction. In other words, when a reference pixel is unavailable, unavailable reference pixel information may be used by being substituted with at least one reference pixel of available reference pixels.

In intra prediction, a prediction mode may have a directional prediction mode which uses reference pixel information according to a prediction direction and a nondirectional mode which does not use directional information when prediction is performed. A mode for predicting luma information may be different from a mode for predicting chroma information and intra prediction mode information used to predict luma information or predicted luma signal information may be utilized to predict chroma information.

An intra prediction method may generate a prediction block after an AIS (Adaptive Intra Smoothing) filter is applied to a reference pixel according to a prediction mode. A type of an AIS filer applied to a reference pixel may be different. An intra prediction mode of a current prediction unit may be predicted from an intra prediction mode of a prediction unit around a current prediction unit to perform an intra prediction method. When a prediction mode of a current prediction unit is predicted by using mode information predicted from a peripheral prediction unit, information that a prediction mode of a current prediction unit is the same as that of a peripheral prediction unit may be transmitted by using predetermined flag information if an intra prediction mode of a current prediction unit is the same as that of a peripheral prediction unit. Prediction mode information of a current block may be encoded by performing entropy encoding if a prediction mode of a current prediction unit is different from that of a peripheral prediction unit.

In addition, a residual block including residual value information, a difference value between a prediction unit which performs prediction based on a prediction unit generated in a prediction unit 120 and 125 and an original block of a prediction unit, may be generated. A generated residual block may be input into a transform unit 130.

A transform unit 130 may transform a residual block including residual data by using a transform type such as DCT, DST, etc. In this case, a transform method may be determined based on an intra prediction mode of a prediction unit used to generate a residual block.

A quantization unit 135 may quantize values which are transformed into a frequency domain in a transform unit 130. According to a block or according to image importance, a quantization coefficient may be changed. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change two-dimensional block-shaped coefficients into a one-dimensional vector shape through a coefficient scanning method. For example, in a rearrangement unit 160, a DC coefficient to a coefficient in a high frequency domain may be scanned by using a predetermined scanning type and may be changed into a one-dimensional vector shape.

An entropy encoding unit 165 may perform entropy encoding based on values calculated by a rearrangement unit 160. For example, entropy encoding may use various encoding methods such as Exponential Golomb, CAVLC(Context-Adaptive Variable Length Coding), CABAC(Context-Adaptive Binary Arithmetic Coding).

An entropy encoding unit 165 may encode various information such as residual value coefficient information and block type information of a coding unit, prediction mode information, partitioning unit information, prediction unit information and transmission unit information, motion vector information, reference frame information, interpolation information of a block, filtering information, etc. from a rearrangement unit 160 and a prediction unit 120 and 125.

In an entropy encoding unit 165, a coefficient value of a coding unit input in a rearrangement unit 160 may be entropy-encoded.

In a dequantization unit 140 and an inverse transform unit 145, values quantized in a quantization unit 135 are dequantized and values transformed in a transform unit 130 are inverse-transformed. A reconstructed block may be generated by combining a residual value generated in a dequantization unit 140 and an inverse transform unit 145 with a prediction unit which is predicted through a motion prediction unit, a motion compensation unit and an intra prediction unit included in a prediction unit 120 and 125.

A filter unit 150 may include at least one of a deblocking filter, an offset modification unit or ALF (Adaptive Loop Filter).

A deblocking filter may remove block distortion generated by a boundary between blocks in a reconstructed picture. Whether a deblocking filter will be applied to a current block may be determined based on a pixel included in several columns or rows included in a block in order to determine whether deblocking is performed. When a deblocking filter is applied to a block, a strong filter or a weak filter may be applied according to strength of necessary deblocking filtering. In addition, in applying a deblocking filter, horizontal directional filtering and vertical directional filtering may be processed in parallel when vertical filtering and horizontal filtering are performed.

An offset modification unit may modify an offset with an original image in a pixel unit for an image performing deblocking. A method in which a pixel included in an image is divided into the certain number of regions, a region which will perform an offset is determined and an offset is applied to the corresponding region or a method in which an offset is applied by considering edge information of each pixel may be used to perform offset modification for a specific picture.

ALF (Adaptive Loop Filter) may be performed based on a value obtained by comparing a filtered reconstructed image with an original image. Pixels included in an image may be divided into a predetermined group, one filter to be applied to the corresponding group may be determined and filtering may be performed discriminately per group. Information related to whether ALF is applied may be transmitted per coding unit (CU) for a luma signal and a shape and a filter coefficient of an ALF filter to be applied may be different according to each block. In addition, an ALF filter of the same shape (fixed shape) may be applied regardless of a feature of a target block to be applied.

A memory 155 may store a reconstructed block or picture calculated in a filter unit 150 and a stored reconstructed block or picture may be provided to a prediction unit 120 and 125 when inter prediction is performed.

Figure 2:
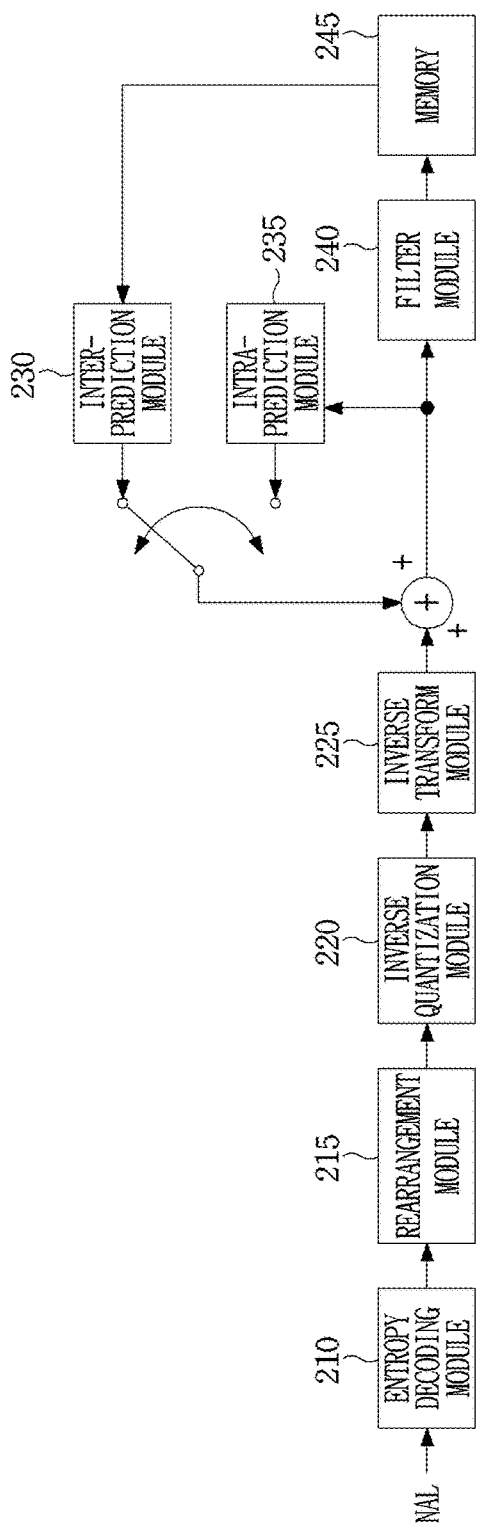
FIG. 2 shows a rough block diagram of a decoding device as an embodiment of the present disclosure.

FIG. 2 shows a rough block diagram of an decoding device as an embodiment of the present disclosure.

In reference to FIG. 2, a decoding device 200 may include an entropy decoding unit 210, a rearrangement unit 215, a dequantization unit 220, an inverse transform unit 225, a prediction unit 230 and 235, a filter unit 240 and a memory 245.

As each construction unit shown in FIG. 2 is independently shown to represent different characteristic functions in a decoding device, it may mean that each construction unit is configured with a separated hardware. But, as each construction unit is included by being enumerated as each construction unit for convenience of description, at least two construction units among each construction unit may be combined to configure one construction unit or one construction unit may be divided into a plurality of construction units to perform a function and such an integrated embodiment and separated embodiment of each construction unit are also included in a scope of a right of the present disclosure as long as they are not beyond the essence of the present disclosure.

An entropy decoding unit 210 may perform entropy decoding for an input bitstream. For example, for entropy decoding, various methods such as Exponential Golomb, CAVLC(Context-Adaptive Variable Length Coding) and CABAC(Context-Adaptive Binary Arithmetic Coding) may be applied.

In an entropy decoding unit 210, information related to intra prediction and inter prediction performed in an encoding device may be decoded.

A rearrangement unit 215 may perform rearrangement for a bitstream entropy-decoded in an entropy decoding unit 210. Coefficients represented in a one-dimensional vector shape may be rearranged by reconstructing into coefficients in a two-dimensional block shape. In a rearrangement unit 215, information related to coefficient scanning performed in an encoding device may be provided and rearrangement may be performed in an inverse scanning method based on a scanning order performed in the corresponding encoding device.

A dequantization unit 220 may perform dequantization based on a quantization parameter and a coefficient value of a rearranged block.

An inverse transform unit 225 may perform inverse-transform on a dequantized transform coefficient in a predetermined transform method. In this case, a transform method may be determined based on information on a prediction method (inter/intra prediction), a size/a shape of a block, an intra prediction mode, etc.

A prediction unit 230 and 235 may generate a prediction block based on information related to prediction block generation provided in an entropy decoding unit 210 and pre-decoded block or picture information provided in a memory 245.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, distinguish a prediction unit from a current coding unit (CU) and determine whether a prediction unit performs inter prediction or intra prediction. An inter prediction unit 230 may perform inter prediction on a current prediction unit based on information included in at least one picture of a previous picture or a subsequent picture of a current picture that a current prediction unit is included, by using information necessary for inter prediction of a current prediction unit provided by an encoding device. Alternatively, inter prediction may be performed based on information of some regions which are pre-reconstructed in a current picture that a current prediction unit is included.

To perform inter prediction, whether a motion prediction method of a prediction unit included in a corresponding coding unit is a skip mode, a merge mode or a AMVP mode may be determined in a coding unit.

An intra prediction unit 235 may generate a prediction block based on pixel information in a current picture. When a prediction unit is a prediction unit which performs intra prediction, intra prediction may be performed based on intra prediction mode information of a prediction unit provided by an encoding device. An intra prediction unit 235 may include an AIS (adaptive intra smoothing) filter, a reference pixel interpolation unit and a DC filter. An AIS filter is a part performing filtering for a reference pixel of a current block and may be applied by determining whether a filter is applied according to a prediction mode of a current prediction unit. AIS filtering may be performed for a reference pixel of a current block by using a prediction mode of a prediction unit and AIS filter information provided by an encoding device. When a prediction mode of a current block is a mode where AIS filtering is not performed, an AIS filter may not be applied.

When a prediction mode of a prediction unit is a prediction unit in which intra prediction is performed based on a pixel value interpolating a reference pixel, a reference pixel interpolation unit may interpolate a reference pixel to generate a reference pixel in a pixel unit which is equal to or less than an integer value. When a prediction mode of a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an encoding device. A deblocking filter of a decoding device may receive information related to a deblocking filter provided by an encoding device and perform deblocking filtering for a corresponding block in a decoding device.

An offset modification unit may perform offset modification on a reconstructed image based on a type of offset modification, offset value information, etc. applied to an image in encoding.

An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

Figure 3:
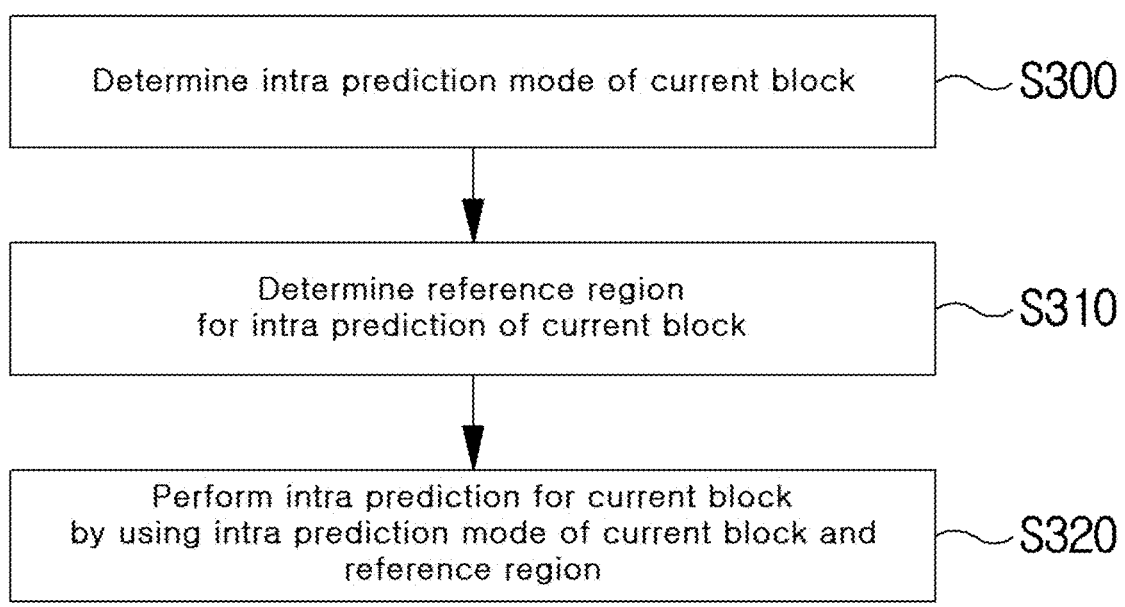
FIG. 3 shows an intra prediction method as an embodiment to which the present disclosure is applied.

FIG. 3 shows an intra prediction method as an embodiment to which the present disclosure is applied.

In reference to FIG. 3, an intra prediction mode of a current block may be determined S300.

Concretely, a decoding device may obtain a first flag from a bitstream. The first flag may represent whether an intra prediction mode of a current block is derived from a candidate mode list (a first candidate group). A candidate mode list may include k candidate modes (MPM) and k may be an integer such as 1, 2, 3, 4, 5, 6, or more.

When the first flag is a first value (i.e., when an intra prediction mode of a current block is derived from a first candidate group), a decoding device may obtain index information (mpm_idx) from a bitstream. In this case, index information may specify any one of a plurality of MPM belonging to the candidate mode list. An intra prediction mode of a current block may be determined based on the candidate mode list and index information. In other words, a MPM specified by the index information may be set as an intra prediction mode of a current block. But, index information may be used only when a plurality of MPM are included in a candidate mode list. For example, when only one MPM is included in a candidate mode list, signaling of index information may be omitted and the corresponding MPM may be set as an intra prediction mode of a current block.

The MPM may be determined by using a neighboring block of a current block. The neighboring block may mean a block which is adjacent to at least one of a left, a top, a top-left, a top-right or a bottom-right of a current block. The number of the neighboring blocks may be 1, 2, 3, 4, 5, or more. The number may be the fixed number which is predefined in an encoding/decoding device. The number may be variably determined based on a predetermined encoding parameter. The encoding parameter may include information on a block attribute. Herein, a block attribute may mean a position, a size, a shape, a ratio of a width and a height, a length value of a width and a height, a partitioning method (e.g., Quadtree, Binary tree, Ternary tree), a partitioning depth, a value of an intra prediction mode, whether an intra prediction mode is a directional mode, an angle of an intra prediction mode, a component type (luma, chroma), etc. Alternatively, the number may be encoded and signaled in an encoding device. The signaling may be performed in a level of at least one of a video sequence, a picture, a slice, a tile or a predetermined partial region (e.g., CTU row, CTU, CU, PU, etc.).

The MPM may be determined based on at least one of (A) whether an intra prediction mode between the above-described neighboring blocks is the same, (B) whether an intra prediction mode of a neighboring block is a directional mode, (C) whether an intra prediction mode of a first neighboring block is greater than an intra prediction mode of a second neighboring block, (D) whether a difference between intra prediction modes between neighboring blocks is the same as a predetermined threshold value or (E) a position of a reference line for intra prediction of a current block. The threshold value may be an arbitrary natural number belonging to a range from 1 to (NumIntraAngMode−1). NumIntraAngMode means the total number of directional modes which are predefined in an encoding/decoding device, which may be 65.

The MPM may be configured with at least one of an intra prediction mode of one or more neighboring blocks, a mode derived by adding or subtracting a value of n to or from an intra prediction mode of a neighboring block, or a default mode. Herein, a value of n may be an integer such as 1, 2, 3, or more. A value of n may be variably determined based on at least one of the above-described (A) to (D). The default mode may include at least one of a Planar mode or a DC mode.

Hereinafter, for convenience of description, a method in which 6 MPM are determined by using 2 neighboring blocks, a top block and a left block, will be described. An intra prediction mode of a top block and an intra prediction mode of a left block are referred to as intraPredModeA and intraPredModeL, respectively.

1. When intraPredModeL and intraPredModeA are the Same

The MPM of a current block may include intraPredModeL, a default mode, a mode derived by subtracting 1 from intraPredModeL, a mode derived by adding 1 to intraPredModeL and a mode derived by adding or subtracting 2 to or from intraPredModeL. An index may be assigned to the MPM based on a predetermined priority. For example, an index may be assigned to each MPM as in the following Table 1. But, a priority of the present disclosure is not limited to Table 1 and a position of a MPM in a candidate mode list may be different from Table 1.

TABLE 1

| | |
|---|---|
| mpm[0] | intraPredModeL |
| mpm[1] | PLANAR |
| mpm[2] | DC |
| mpm[3] | 2 + ((intraPredModeL + 62)%65) |
| mpm[4] | 2 + ((intraPredModeL − 1)%65) |
| mpm[5] | 2 + ((intraPredModeL + 61)%65) |

2. When intraPredModeL and intraPredModeA are Different (1) When Both intraPredModeL and intraPredModeA are Directional Modes, intraPredModeL is Greater than intraPredModeA and a Difference Between intraPredModeL and intraPredModeA is not 1 or 64

The MPM of a current block may include intraPredModeL, intraPredModeA, a default mode, a mode derived by subtracting 1 from intraPredModeL and a mode derived by adding 1 to intraPredModeL. An index may be assigned to the MPM based on a predetermined priority. For example, an index may be assigned to each MPM as in the following Table 2. But, a priority of the present disclosure is not limited to Table 2 and a position of a MPM in a candidate mode list may be different from Table 2.

TABLE 2

| | |
|---|---|
| mpm[0] | intraPredModeL |
| mpm[1] | intraPredModeA |
| mpm[2] | PLANAR |
| mpm[3] | DC |
| mpm[4] | 2 + ((intraPredModeL + 62)%65) |
| mpm[5] | 2 + ((intraPredModeL − 1)%65) |

(2) When Both intraPredModeL and intraPredModeA are Directional Modes, intraPredModeL is Greater than intraPredModeA and a Difference Between intraPredModeL and intraPredModeA is 1 or 64

The MPM of a current block may include intraPredModeL, intraPredModeA, and a default mode. The MPM of a current block may additionally include at least one of a mode derived by subtracting 1 from intraPredModeL, a mode derived by adding 1 to intraPredModeL, a mode derived by subtracting 2 from intraPredModeL or a mode derived by adding 2 to intraPredModeL. When the mode derived by subtracting or adding 1 from or to intraPredModeL is the same as intraPredModeA, it may be excluded from a MPM. In this case, the mode derived by subtracting or adding 2 from or to intraPredModeL may be added/included as a MPM.

An index may be assigned to the MPM based on a predetermined priority. For example, an index may be assigned to each MPM as in the following Table 3. But, a priority of the present disclosure is not limited to Table 3 and a position of a MPM in a candidate mode list may be different from Table 3.

TABLE 3

| | |
|---|---|
| mpm[0] | intraPredModeL |
| mpm[1] | intraPredModeA |
| mpm[2] | PLANAR |
| mpm[3] | DC |
| mpm[4] | 2 + ((intraPredModeL + 61)%65) |
| mpm[5] | 2 + ((intraPredModeL)%65) |

(3) When Both intraPredModeL and intraPredModeA are Directional Modes, intraPredModeL is Less than intraPredModeA and a Difference Between intraPredModeL and intraPredModeA is not 1 or 64

The MPM of a current block may include intraPredModeL, intraPredModeA, a default mode, a mode derived by subtracting 1 from intraPredModeA and a mode derived by adding 1 to intraPredModeA. An index may be assigned to the MPM based on a predetermined priority. For example, an index may be assigned to each MPM as in the following Table 4. But, a priority of the present disclosure is not limited to Table 4 and a position of a MPM in a candidate mode list may be different from Table 4.

TABLE 4

| | |
|---|---|
| mpm[0] | intraPredModeL |
| mpm[1] | intraPredModeA |
| mpm[2] | PLANAR |
| mpm[3] | DC |
| mpm[4] | 2 + ((intraPredModeA + 62)%65) |
| mpm[5] | 2 + ((intraPredModeA − 1)%65) |

(4) When Both intraPredModeL and intraPredModeA are Directional Modes, intraPredModeL is Less than intraPredModeA and a Difference Between intraPredModeL and intraPredModeA is 1 or 64

The MPM of a current block may include intraPredModeL, intraPredModeA, and a default mode. The MPM of a current block may additionally include at least one of a mode derived by subtracting 1 from intraPredModeA, a mode derived by adding 1 to intraPredModeA, a mode derived by subtracting 2 from intraPredModeA or a mode derived by adding 2 to intraPredModeA. When the mode derived by subtracting or adding 1 from or to intraPredModeA is the same as intraPredModeL, it may be excluded from a MPM. In this case, a mode derived by subtracting or adding 2 from or to intraPredModeA may be added/included as a MPM.

An index may be assigned to the MPM based on a predetermined priority. For example, an index may be assigned to each MPM as in the following Table 5. But, a priority of the present disclosure is not limited to Table 5 and a position of a MPM in a candidate mode list may be different from Table 5.

TABLE 5

| | |
|---|---|
| mpm[0] | intraPredModeL |
| mpm[1] | intraPredModeA |
| mpm[2] | PLANAR |
| mpm[3] | DC |
| mpm[4] | 2 + ((intraPredModeA + 61)%65) |
| mpm[5] | 2 + ((intraPredModeA)%65) |

(5) When any One of intraPredModeL and intraPredModeA is a Directional Mode and the Other is a DC Mode The MPM of a current block may include a directional mode (intraPredModeX) of intraPredModeL or intraPredModeA, a default mode, a mode derived by subtracting 1 from intraPredModeX, a mode derived by adding 1 to intraPredModeX and a mode derived by subtracting or adding 2 from or to intraPredModeX.

An index may be assigned to the MPM based on a predetermined priority. For example, an index may be assigned to each MPM as in the following Table 6. But, a priority of the present disclosure is not limited to Table 6 and a position of a MPM in a candidate mode list may be different from Table 6. For example, DC may have a higher priority than intraPredModeX. PLANAR may have a higher priority than DC. PLANAR may have a higher priority than intraPredModeX.

TABLE 6

| | |
|---|---|
| mpm[0] | intraPredModeX |
| mpm[1] | DC |
| mpm[2] | PLANAR |
| mpm[3] | 2 + ((intraPredModeX + 62)%65) |
| mpm[4] | 2 + ((intraPredModeX − 1)%65) |
| mpm[5] | 2 + ((intraPredModeX + 61)%65) |

(6) When any One of intraPredModeL and intraPredModeA is a Directional Mode and the Other is a Planar Mode The MPM of a current block may include a directional mode (intraPredModeX) of intraPredModeL or intraPredModeA, a default mode, a mode derived by subtracting 1 from intraPredModeX, a mode derived by adding 1 to intraPredModeX and a mode derived by subtracting or adding 2 from or to intraPredModeX.

An index may be assigned to the MPM based on a predetermined priority. For example, an index may be assigned to each MPM as in the following Table 7. But, a priority of the present disclosure is not limited to Table 7 and a position of a MPM in a candidate mode list may be different from Table 7. For example, PLANAR may have a higher priority than intraPredModeX. DC may have a higher priority than PLANAR. DC may have a higher priority than intraPredModeX.

TABLE 7

| | |
|---|---|
| mpm[0] | intraPredModeX |
| mpm[1] | PLANAR |
| mpm[2] | DC |
| mpm[3] | 2 + ((intraPredModeX + 62)%65) |
| mpm[4] | 2 + ((intraPredModeX − 1)%65) |
| mpm[5] | 2 + ((intraPredModeX + 61)%65) |

(7) When Both intraPredModeL and intraPredModeA are Nondirectional Modes

The MPM of a current block may include a default mode, a horizontal mode (intraPredModeH), and a vertical mode (intraPredModeV). In addition, the MPM of a current block may additionally include at least one of a mode derived by subtracting or adding 1 from or to intraPredModeH or a mode derived by subtracting or adding 1 from or to intraPredModeV.

An index may be assigned to the MPM based on a predetermined priority. For example, an index may be assigned to each MPM as in the following Table 8. But, a priority of the present disclosure is not limited to Table 8 and a position of a MPM in a candidate mode list may be different from Table 8.

TABLE 8

| | |
|---|---|
| mpm[0] | PLANAR |
| mpm[1] | DC |
| mpm[2] | 2 + ((intraPredModeH + 62)%65) |
| mpm[3] | 2 + ((intraPredModeH − 1)%65) |
| mpm[4] | 2 + ((intraPredModeV + 62)%65) |
| mpm[5] | 2 + ((intraPredModeV − 1)%65) |

Meanwhile, a MPM of a current block may be determined based on a reference region which will be described after. When a reference region of a current block is the k-th reference line, a nondirectional mode may be used and otherwise, it may be restricted so that a nondirectional mode is not used. When a current block is allowed to use a reference line other than the k-th reference line, a nondirectional mode may not be included in the MPM of a current block. k may be 1, 2, 3, or 4. In this case, in the above-described embodiments (1) to (7), a nondirectional mode belonging to a MPM may be replaced with a predetermined intra prediction mode. Herein, a predetermined intra prediction mode may be at least one of an intra prediction mode of a neighboring block or a mode derived by adding/subtracting a value of n to/from an intra prediction mode of a neighboring block. n may be an integer such as 1, 2, 3, or more. The addition/subtraction process may be repeatably performed by increasing a value of n by 1 until a candidate mode list is configured with 6 MPM. But, the 6 is just an example, and the maximum number of MPM configuring a candidate mode list may be 3, 4, 5, 7, 8, 9, or more. The maximum number may be a fixed value which is pre-promised in an encoder/a decoder or may be variably determined based on an encoding parameter (e.g., information related to a block attribute, a position of a reference line, etc.).

When the first flag is a second value (i.e., when an intra prediction mode of a current block is not derived from a first candidate group), a decoding device may obtain remaining mode information from a bitstream. A decoding device may determine an intra prediction mode of a current block based on remaining mode information.

The remaining mode information may be encoded based on remaining modes (hereinafter referred to as non-MPM) other than the above-described MPM in intra prediction modes which are predefined in an encoding/decoding device. The predefined intra prediction modes may include 2 nondirectional modes (a planar mode, a DC mode) and 65 directional modes. For example, an encoding device may generate remaining mode information by encoding a mode corresponding to an intra prediction mode of a current block among the non-MPM.

In the encoding, remaining mode information may be encoded based on a truncated binary coding method. When it is assumed that 67 intra prediction modes and 6 MPM are used, as in the following table, an intra prediction mode with an index of 0~2 may be encoded with 5 bits and an intra prediction mode with an index of 3~60 may be encoded with 6 bits in 61 non-MPM. But, in the following table, the number of bits and the number of intra prediction modes encoded with 5 bits/6 bits may be variably determined based on at least one of the number of predefined intra prediction modes or the number of MPM. In addition, remaining mode information may be encoded based on FLC (fixed length code), VLC (variable length code), etc.

| | Input value | Offset | Offset value | Truncated Binary |
|---|---|---|---|---|
| 5-bits 3 | 0 | 0 | 0 | 00000 |
| | 1 | 0 | 1 | 00001 |
| | 2 | 0 | 2 | 00010 |
| | 3 | 3 | 6 | 000110 |
| | 4 | 3 | 7 | 000111 |
| | ... | | | |
| 6-bits 58개 | 57 | 3 | 60 | 111100 |
| | 58 | 3 | 61 | 111101 |
| | 59 | 3 | 62 | 111110 |
| | 60 | 3 | 63 | 111111 |

Alternatively, the non-MPM may be classified into at least 2 or more groups. For example, the non-MPM may include a second candidate group and a third candidate group. When an intra prediction mode of a current block is not derived from a first candidate group, an intra prediction mode of a current block may be derived by selectively using any one of a second candidate group or a third candidate group.

In this case, a second candidate group may be configured with a mode derived based on a MPM and a third candidate group may be configured with remaining modes other than a second candidate group among the non-MPM. Alternatively, a second candidate group may be configured based on an intra prediction mode of a neighboring block and/or a mode neighboring an intra prediction mode of a neighboring block. In other words, a second candidate group may be derived in a method which is the same as/similar to the above-described first candidate group, but a second candidate group may not include a MPM belonging to a first candidate group. For example, a second candidate group may include at least one of modes that a difference of a mode value with an intra prediction mode of a neighboring block is +1, −1, +2, −2, +3, −3, . . . , +L, −L and hereinafter, it will be described on the assumption that a second candidate group is configured with 5 candidate modes. But, it is not limited thereto and the number of candidate modes belonging to a second candidate group may be an integer such as 1, 2, 3, 4, 6, or more.

Concretely, a second candidate group may be determined by considering at least one of whether an intra prediction mode of a left block (candIntraPredModeA) and an intra prediction mode of a top block (candIntraPredModeB) are the same or whether candIntraPredModeA and candIntraPredModeB are nondirectional modes.

For example, when candIntraPredModeA and candIntraPredModeB are the same and candIntraPredModeA is not a nondirectional mode, a second candidate group may include at least one of candIntraPredModeA, (candIntraPredModeA−n), (candIntraPredModeA+n) or a nondirectional mode. Herein, n may be an integer such as 1, 2, or more. The nondirectional mode may include at least one of a Planar mode or a DC mode. In an example, a candidate mode of a second candidate group may be determined as in the following Table 9. An index in Table 9 specifies a position or a priority of a candidate mode, but is not limited thereto.

TABLE 9

| index | Candidate mode |
|---|---|
| 0 | candIntraPredModeA |
| 1 | 2 + ((candIntraPredModeA + 61)%64) |
| 2 | 2 + ((candIntraPredModeA − 1)%64) |
| 3 | 2 + ((candIntraPredModeA + 60)%64) |
| 4 | 2 + (candIntraPredModeA %64) |

Alternatively, when candIntraPredModeA and candIntraPredModeB are not the same and both candIntraPredModeA and candIntraPredModeB are not nondirectional modes, a second candidate group may include at least one of candIntraPredModeA, candIntraPredModeB, (maxAB−n), (maxAB+n), (minAB−n), (minAB+n) or a nondirectional mode. Herein, maxAB and minAB may mean the maximum value and the minimum value of candIntraPredModeA and candIntraPredModeB, respectively, and n may be an integer such as 1, 2, or more. The nondirectional mode may include at least one of a Planar mode or a DC mode. In an example, a candidate mode of a second candidate group may be determined as in the following Table 10 based on a difference value (D) between candIntraPredModeA and candIntraPredModeB.

TABLE 10

| Index | Candidate mode (D = 1) | Candidate mode (D = 2) | Candidate mode (D >= 62) | Candidate mode (Otherwise) |
|---|---|---|---|---|
| 0 | candIntraPredModeA | candIntraPredModeA | candIntraPredModeA | candIntraPredModeA |
| 1 | candIntraPredModeB | candIntraPredModeB | candIntraPredModeB | candIntraPredModeB |
| 2 | 2 + ((minAB + 61)%64) | 2 + ((minAB − 1)%64) | 2 + ((minAB − 1)%64) | 2 + ((minAB + 61)%64) |
| 3 | 2 + ((maxAB − 1)%64) | 2 + ((minAB + 61)%64) | 2 + ((maxAB + 61)%64) | 2 + ((minAB − 1)%64) |
| 4 | 2 + ((minAB + 60)%64) | 2 + ((maxAB − 1)%64) | 2 + (minAB%64) | 2 + ((maxAB + 61)%64) |

Alternatively, when candIntraPredModeA and candIntraPredModeB are not the same and only any one of candIntraPredModeA and candIntraPredModeB is a nondirectional mode, a second candidate group may include at least one of maxAB, (maxAB-n), (maxAB+n) or a nondirectional mode. Herein, maxAB may mean the maximum value of candIntraPredModeA and candIntraPredModeB and n may be an integer such as 1, 2, more. The nondirectional mode may include at least one of a Planar mode or a DC mode. In an example, a candidate mode of a second candidate group may be determined as in the following Table 11. An index in Table 11 specifies a position or a priority of a candidate mode, but is not limited thereto.

TABLE 11

| index | Candidate mode |
|---|---|
| 0 | maxAB |
| 1 | 2 + ((maxAB + 61)%64) |
| 2 | 2 + ((maxAB − 1)%64) |
| 3 | 2 + ((maxAB + 60)%64) |
| 4 | 2 + (maxAB %64) |

Alternatively, when candIntraPredModeA and candIntraPredModeB are not the same and both candIntraPredModeA and candIntraPredModeB are nondirectional modes, a second candidate group may include at least one of a nondirectional mode, a vertical mode, a horizontal mode, (a vertical mode−m), (a vertical mode+m), (a horizontal mode−m) or (a horizontal mode+m). Herein, m may be an integer such as 1, 2, 3, 4, or more. The nondirectional mode may include at least one of a Planar mode or a DC mode. In an example, a candidate mode of a second candidate group may be determined as in the following Table 12. An index in Table 12 specifies a position or a priority of a candidate mode, but is not limited thereto. For example, an index 1 may be assigned to a horizontal mode or the largest index may be assigned. In addition, a candidate mode may include at least one of a diagonal mode (e.g., a mode 2, a mode 34, a mode 66), (a diagonal mode−m) or (a diagonal mode+m).

TABLE 12

| Index | Candidate mode |
|---|---|
| 0 | INTRA_DC |
| 1 | Vertical Mode |
| 2 | Horizontal Mode |
| 3 | (Vertical Mode − 4) |
| 4 | (Vertical Mode + 4) |

As described above, a second candidate group may include a plurality of candidate modes. First remaining mode information specifying any one of a plurality of candidate modes may be signaled. A candidate mode specified by signaled first remaining mode information may be set as an intra prediction mode of a current block. Alternatively, when first and second candidate groups are not used, second remaining mode information may be signaled. Second remaining mode information may specify any one of remaining modes other than candidate modes belonging to first and second candidate groups among intra prediction modes which are predefined in an encoding/decoding device. A candidate mode specified by second remaining mode information may be set as an intra prediction mode of a current block.

A method of determining the above-described second candidate group will be described by referring to FIGS. 4A-4B and 5.

The remaining mode information may be encoded based on remaining modes other than a second candidate group among the non-MPM or may be encoded based on a non-MPM that at least one of a second candidate group or a third candidate group is rearranged, which will be described by referring to FIGS. 6 and 7.

In reference to FIG. 3, a reference region for intra prediction of a current block may be determined S310.

The reference region may mean a peripheral region which is spatially adjacent to a current block and a pre-reconstructed region before a current block. The reference region may include one or more reference lines. For example, a reference region may include at least one of a first reference line, a second reference line, a third reference line or a fourth reference line. Herein, a first reference line may mean a reference line adjacent to the left and/or the top of a current block and a second reference line may mean a reference line adjacent to the left and/or the top of a first reference line. A third reference line may mean a reference line adjacent to the left and/or the top of a second reference line and a fourth reference line may mean a reference line adjacent to the left and/or the top of a third reference line.

A current block may be intra-predicted by using the predetermined number of reference lines. The number of reference lines 1) may be the fixed number which is pre-promised in an encoding/decoding device or 2) may be the number derived in a decoding device based on an encoding parameter or 3) information on the number may be encoded and signaled in an encoding device. The number may be determined by using any one of the above-described embodiments 1) to 3) or may be derived based on a combination of at least two of embodiments 1) to 3). The number of the determined reference lines may be 0, 1, 2, 3, 4, or more.

The encoding parameter may include information on a block attribute, which is the same as described above. Herein, a block attribute may mean a position, a size, a shape, a ratio of a width and a height, a length value of a width and a height, a partitioning method, a partitioning depth, a value of an intra prediction mode, whether an intra prediction mode is a directional mode, an angle of an intra prediction mode, a component type (luma, chroma), etc.

In an example, whether a current block is located on a boundary in an image may be considered. Herein, a boundary may mean a boundary between partial images and a partial image may be a slice, a tile, a CTU row, a CTU, etc. as described above. If a current block is in contact with a boundary in an image, it may be restricted so that a top reference region of a current block includes only p reference lines.

In an example, the number of reference lines may be determined based on a comparison between an intra prediction mode of a current block and a predetermined first threshold value. For example, when an intra prediction mode of a current block is less than a predetermined first threshold value, p reference lines may be used and when an intra prediction mode of a current block is greater than or equal to a predetermined first threshold value, q reference lines may be used. The comparison may be a comparison with a mode value or a comparison with an angle of an intra prediction mode. The first threshold value may be a pre-defined value in an encoding/decoding device. For example, a first threshold value may mean information on at least one of a planar mode, a DC mode, a vertical mode, or a horizontal mode.

In an example, the number of reference lines may be determined based on a length value of a width and a height of a current block. For example, when a width of a current block is greater than a height, a top reference region may include q reference lines and a left reference region may include p reference lines. Alternatively, when a width of a current block is greater than a predetermined second threshold value, a top reference region may include q reference lines and otherwise, a top reference region may include p reference lines. The above-described p may be 0, 1 or 2 and q may be 1, 2, 3 or 4. p may be less than q.

A current block may perform intra prediction by selecting one or more reference lines of the above-described first to fourth reference lines. In this case, a position of a reference line 1) may be a pre-promised position in an encoding/decoding device, or 2) may be derived from a decoding device based on number information of the above-described reference lines, or 3) information specifying a position of a reference line (mrl_idx) may be encoded in an encoding device and signaled. The information (mrl_idx) may be signaled by considering at least one of number information of reference lines or information on the above-described block attributes. The position may be determined by using any one of the above-described embodiments 1) to 3) or may be determined based on a combination of at least two of embodiments 1) to 3).

There may be a case in which a reference line is unavailable for intra prediction of a current block. The unavailable case may mean 1) a case in which a reference line does not exist at a corresponding position, 2) a case in which a reference line is positioned in a partial image different from a current block, 3) a case in which a reference line at a corresponding position has a coding order after a current block.

When a reference line is unavailable, a reference line at a corresponding position may be excluded from a reference region. Alternatively, an unavailable reference line may be substituted by using an available reference line. Herein, an available reference line may include a peripheral sample of an unavailable reference line, a peripheral sample of a current block, etc. Herein, a peripheral sample may mean a sample neighboring at least one of a left, right, top, bottom or diagonal direction.

In reference to FIG. 3, intra prediction for a current block may be performed by using an intra prediction mode of a current block and a reference region S320.

Figure 4A:
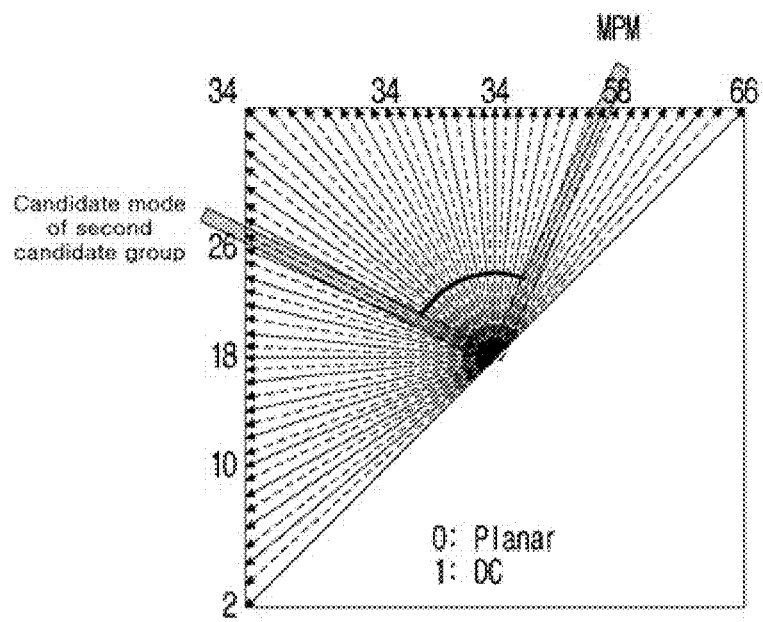
FIGS. 4A-4B and 5 show a method in which a second candidate group is determined as an embodiment to which the present disclosure is applied.
Figure 4B:
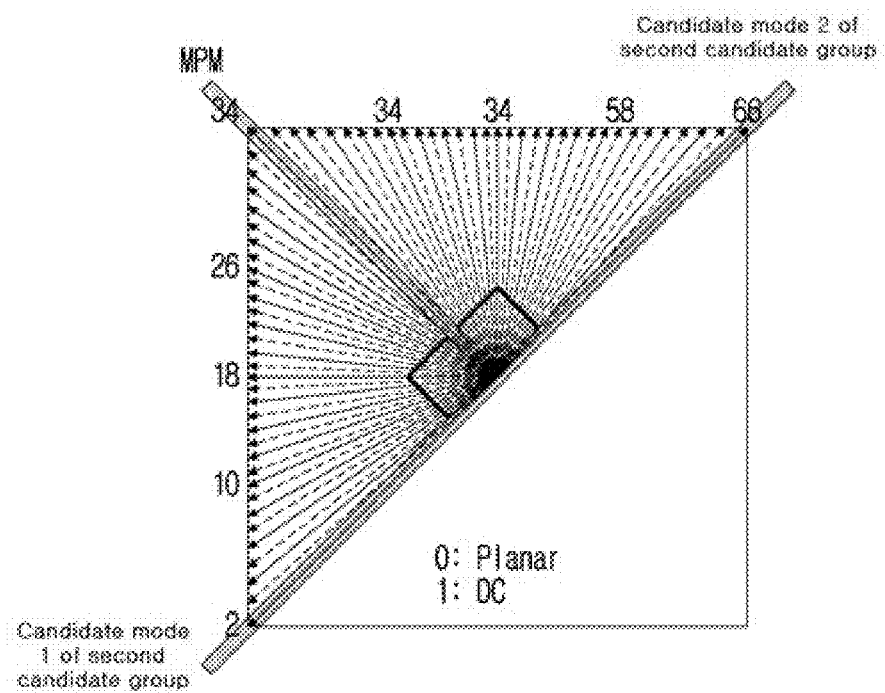
Figure 5:
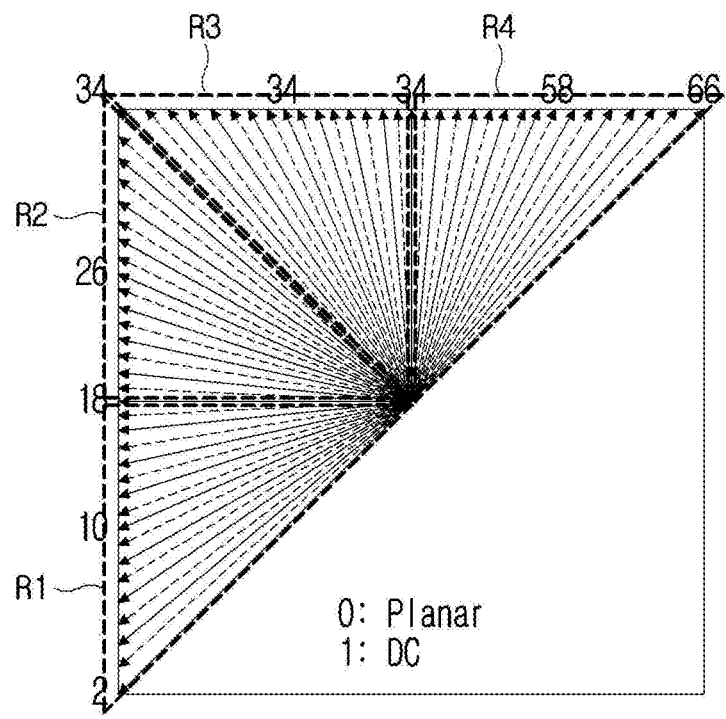

FIGS. 4A-4B to 5 show a method in which a second candidate group is determined as an embodiment to which the present disclosure is applied.

A second candidate group may be determined by an operation which subtracts/adds a predetermined value of m from/to a MPM (embodiment 1). The operation may be performed for a plurality of MPM, respectively. It may be restricted so that the operation is not performed for a planar mode or a DC mode among the MPM. Herein, a value of m may be an integer such as 2, 3, 4, or more. The value of m may be greater than a value of n mentioned in FIG. 3.

The above-described subtraction/addition operation may be performed based on a result of comparison between a mode value of a MPM and a base mode value. A base mode value may mean mode 2, mode 18 (a horizontal mode), mode 34 (a diagonal mode), mode 50 (a vertical mode) or mode 66. In this description, mode A may mean an intra prediction mode having a mode value of A.

For example, when a mode value of a MPM is greater than or equal to a base mode value, an operation which subtracts a predetermined value of m from a MPM may be performed and otherwise, an operation which adds a predetermined value of m to a MPM may be performed. Conversely, when a mode value of a MPM is greater than or equal to a base mode value, an operation which adds a predetermined value of m to a MPM may be performed and otherwise, an operation which subtracts a predetermined value of m from a MPM may be performed.

Meanwhile, i base mode values may be used. Herein, a value of i may be 1, 2, 3, 4, or 5. For example, when a value of i is 2, base mode values may include a first base mode value and a second base mode value. In this case, a first base mode value may be any one of the above-described 5 modes and a second base mode value may be another of 5 modes.

In an example, in reference to FIG. 4A, a second candidate group may include a mode corresponding to a value which subtracts 32 from a mode value of a MPM when a MPM is greater than mode 34. In reference to FIG. 4B, a second candidate group may include mode 2 and mode 66 when a MPM is mode 34. A second candidate group may include a mode corresponding to a value which adds 32 to a mode value of a MPM when a MPM is less than mode 34.

In addition to a mode derived based on a MPM, a second candidate group may further include its neighboring mode (embodiment 2). A neighboring mode may be determined by adding or subtracting an integer such as 1, 2, 3, or more to or from a mode derived based on a MPM.

A second candidate group may be also determined based on a position of a region to which a MPM belongs (embodiment 3). Predefined intra prediction modes in an encoding/decoding device may be classified into a plurality of regions. For convenience of description, FIG. 5 shows that predefined intra prediction modes are classified into 4 regions.

In reference to FIG. 5, a first region (R1) may include mode 2 to mode 17, a second region (R2) may include mode 18 to mode 33, a third region (R3) may include mode 34 to mode 49 and a fourth region (R4) may include mode 50 to mode 66.

A second candidate group may be determined based on an intra prediction mode of a region adjacent to a region to which a MPM belongs. For example, when a MPM belongs to a first region, a second candidate group may be determined from at least one of a second region or a fourth region. In this case, a second candidate group may be determined based on the minimum value, the maximum value, a center value or a base mode value of intra prediction modes belonging to the corresponding region.

Alternatively, a second candidate group may be determined based on an intra prediction mode of a region non-adjacent to a region to which a MPM belongs. For example, when a MPM belongs to a second region, a second candidate group may be determined from a fourth region. Alternatively, when a MPM belongs to a third region, a second candidate group may be determined from a first region. In this case, a second candidate group may be determined based on the minimum value, the maximum value, a center value or a base mode value of intra prediction modes belonging to the corresponding region.

A second candidate group may be determined based on at least one of the above-described embodiments 1) to 3) or may be determined based on a combination of at least two of embodiments 1 to 3.

Meanwhile, the above-determined second candidate group may include a mode overlapped with the above-determined MPM. A mode overlapped with the MPM may be removed from a second candidate group. As a result of the removal, the number of intra prediction modes belonging to a second candidate group may be less than the maximum number of a second candidate group (MaxNumNonMPM). In this case, an intra prediction mode according to the above-described embodiment 2 or 3 may be added to a second candidate group. The addition may be repeatably performed until the number of intra prediction modes belonging to a second candidate group is the same as MaxNumNonMPM. The MaxNumNonMPM may be the fixed number which is pre-promised in an encoding/decoding device or may be variably determined based on the number of MPM belonging to a candidate mode list.

FIG. 6 relates to a method in which remaining mode information is encoded/decoded based on removal of a second candidate group as an embodiment to which the present disclosure is applied.

An encoding device may encode remaining mode information based on remaining modes (a third candidate group) other than a second candidate group among the non-MPM.

In the encoding, remaining mode information may be encoded based on a truncated binary coding method. For convenience of description, it is assumed that 67 intra prediction modes and 6 MPM are used.

In reference to FIG. 6, when the number of a second candidate group is 4, the number of a third candidate group is 57. In a third candidate group, an intra prediction mode having an index of 0~6 may be encoded with 5 bits and an intra prediction mode having an index of 7~56 may be encoded with 6 bits.

|  | Input value | Offset | Offset value | Truncated Binary |
|---|---|---|---|---|
| 5-bits 7개 | 0 | 0 | 0 | 00000 |
|  | 1 | 0 | 1 | 00001 |
|  | 2 | 0 | 2 | 00010 |
|  | 3 | 0 | 3 | 00011 |
|  | 4 | 0 | 4 | 00100 |
|  | 5 | 0 | 5 | 00101 |
|  | 6 | 0 | 6 | 00110 |
|  | 7 | 7 | 14 | 001110 |
|  | 8 | 7 | 15 | 001111 |
|  | ... | | | |
| 6-bits 50개 | 53 | 7 | 60 | 111100 |
|  | 54 | 7 | 61 | 111101 |
|  | 55 | 7 | 62 | 111110 |
|  | 56 | 7 | 63 | 111111 |

Alternatively, when the number of a second candidate group is 5, the number of a third candidate group is 56. In a third candidate group, an intra prediction mode having an index of 0~7 may be encoded with 5 bits and an intra prediction mode having an index of 8~55 may be encoded with 6 bits.

|  | Input value | Offset | Offset value | Truncated Binary |
|---|---|---|---|---|
| 5-bits 5개 | 0 | 0 | 0 | 00000 |
|  | 1 | 0 | 1 | 00001 |
|  | 2 | 0 | 2 | 00010 |
|  | 3 | 0 | 3 | 00011 |
|  | 4 | 0 | 4 | 00100 |
|  | ... | | | |
|  | 7 | 0 | 7 | 00111 |

|  | Input value | Offset | Offset value | Truncated Binary |
|---|---|---|---|---|
| 6-bits 48개 | 8 | 8 | 16 | 010000 |
|  | 9 | 8 | 17 | 010001 |
|  | ... |  |  |  |
|  | 52 | 8 | 60 | 111100 |
|  | 53 | 8 | 61 | 111101 |
|  | 54 | 8 | 62 | 111110 |
|  | 55 | 8 | 63 | 111111 |

Alternatively, when the number of a second candidate group is 13, the number of a third candidate group is 48. In a third candidate group, an intra prediction mode having an index of 0~15 may be encoded with 5 bits and an intra prediction mode having an index of 16~47 may be encoded with 6 bits.

|  | Input value | Offset | Offset value | Truncated Binary |
|---|---|---|---|---|
| 5-bits 16개 | 0 | 0 | 0 | 00000 |
|  | 1 | 0 | 1 | 00001 |
|  | 2 | 0 | 2 | 00010 |
|  | 3 | 0 | 3 | 00011 |
|  | 4 | 0 | 4 | 00100 |
|  | ... |  |  |  |
|  | 15 | 0 | 15 | 01111 |
| 6-bits 32개 | 16 | 16 | 32 | 100000 |
|  | 17 | 16 | 33 | 100001 |
|  | ... |  |  |  |
|  | 44 | 16 | 60 | 111100 |
|  | 45 | 16 | 61 | 111101 |
|  | 46 | 16 | 62 | 111110 |
|  | 47 | 16 | 63 | 111111 |

But, the above-described embodiment is just an example, and the number of bits and the number of intra prediction modes encoded with 5 bits/6 bits may be variably determined based on at least one of the number of predefined intra prediction modes, the number of MPM or the number of a second candidate group. In addition, remaining mode information may be encoded based on FLC (fixed length code), VLC (variable length code), etc.

A decoding device may obtain remaining mode information through a bitstream.

A decoding device may rearrange MPM in a candidate mode list in an ascending order. The rearranged MPM may be compared with remaining mode information. As a result of the comparison, when remaining mode information is greater than or equal to the MPM, a first process which adds 1 to remaining mode information may be performed. The first process may be sequentially performed for each of rearranged MPM. In addition, a second candidate group belonging to a first group of the non-MPM may be rearranged in an ascending order. A rearranged second candidate group may be compared with a mode value obtained through the first process. As a result of the comparison, when a mode value is greater than or equal to a second candidate group, a second process which adds 1 to a mode value may be performed. The second process may be sequentially performed for each of the rearranged second candidate group. A decoding device may set a mode value obtained through the first process and second process as an intra prediction mode of a current block.

Alternatively, a decoding device may generate one list by combining a candidate mode list and a first group of the non-MPM. The generated list may be configured with intra prediction modes including the MPM and the second candidate group and may be rearranged in an ascending order. A rearranged intra prediction mode may be compared with remaining mode information. As a result of the comparison, when remaining mode information is greater than or equal to a rearranged intra prediction mode, a process which adds 1 to remaining mode information may be performed. The process may be sequentially performed for each of rearranged intra prediction modes. A decoding device may set a mode value obtained through the process as an intra prediction mode of a current block.

Figure 7:
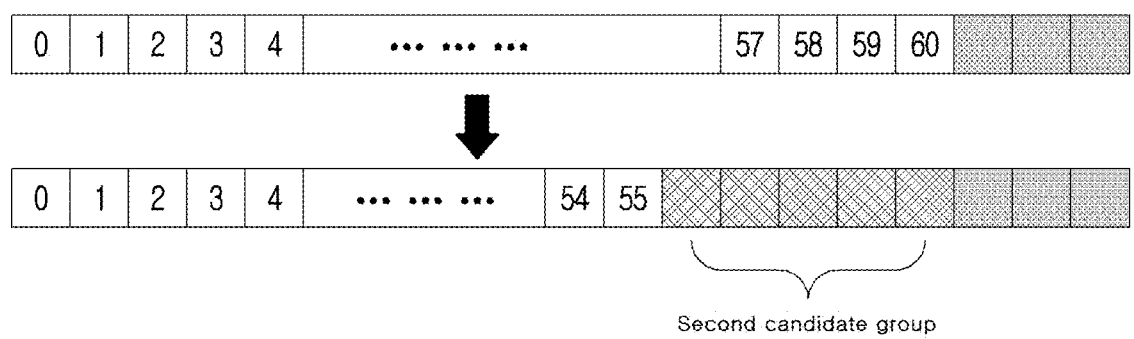
FIG. 7 relates to a method in which remaining mode information is encoded/decoded based on rearrangement of a second candidate group as an embodiment to which the present disclosure is applied.

FIG. 7 relates to a method in which remaining mode information is encoded/decoded based on rearrangement of a second candidate group as an embodiment to which the present disclosure is applied.

An encoding device may encode remaining mode information based on remaining modes (non-MPM) other than MPM among the predefined intra prediction modes. An encoding device may rearrange a second candidate group of the non-MPM list at a predetermined position and encode remaining mode information based on a rearranged non-MPM list. The position may be a pre-promised position in an encoding/decoding device.

In reference to FIG. 7, a second candidate group may be rearranged to be positioned behind a third candidate group. Through it, an intra prediction mode corresponding to a second candidate group may be encoded with a codeword which is longer than a third candidate group.

Alternatively, a second candidate group may be rearranged to be positioned before a third candidate group. Through it, an intra prediction mode corresponding to a second candidate group may be encoded with a codeword which is shorter than a third candidate group. In other words, an intra prediction mode corresponding to a second candidate group may be encoded with a short codeword and a third candidate group may be encoded with a relatively long codeword.

In the above-described embodiment, only some of a third candidate group may be selectively arranged before or behind a second candidate group. For example, some of the third candidate group may mean a mode whose mode value is an even number or may mean a mode whose mode value is an odd number among intra prediction modes included in a third candidate group.

Alternatively, some of the third candidate group may mean a mode whose mode value is a multiple of k among intra prediction modes included in a third candidate group. Herein, k may be an integer such as 2, 3, 4, 5, or more. In the present disclosure, it is disclosed that some of a third candidate group is selected based on a mode value of an intra prediction mode belonging to a third candidate group, but it is just an example. For example, a third candidate group may be grouped with i intra prediction modes. Some of a third candidate group may be determined by selecting at least one intra prediction mode in each group. Herein, i may be an integer such as 2, 3, 4, 5, 6, or more. An intra prediction mode corresponding to the minimum value, the maximum value or a center value among modes belonging to each group may be selected. Alternatively, some of a third candidate group may be determined based on a result of comparison between an intra prediction mode of a third candidate group and an intra prediction mode of a second candidate group (or, an intra prediction mode of the MPM). For example, a mode which satisfies that a difference between the mode values is less than or equal to a predetermined threshold value may be selected.

Alternatively, the non-MPM may be rearranged/reconfigured to include only a second candidate group by removing remaining modes (i.e., a third candidate group) other than a second candidate group from the non-MPM. As a third candidate group is not used, the number of intra prediction modes belonging to the non-MPM list may be reduced and a second candidate group may be encoded with a shorter codeword.

A decoding device may obtain remaining mode information through a bitstream. An intra prediction mode of a current block may be decoded based on the remaining mode information. The decoding may be performed based on at least one of the number of the second candidate group, an arrangement position of a second candidate group within the non-MPM or a value of remaining mode information. Also, the decoding may further include a process in which the MPM/the second candidate group are arranged in an ascending order and compared as shown in FIG. 6.

In an example, it is assumed that the number of the second candidate group is 5 and a second candidate group is positioned behind a third candidate group.

If the remaining mode information has a value of 56 to 60, a decoding device may determine an intra prediction mode corresponding to a value of the remaining mode information. The determined intra prediction mode may be set as an intra prediction mode of a current block.

On the other hand, when the remaining mode information has a value of 0 to 55, a decoding device may rearrange MPM in a candidate mode list in an ascending order. The rearranged MPM may be compared with remaining mode information. As a result of the comparison, when remaining mode information is greater than or equal to the MPM, a first process which adds 1 to remaining mode information may be performed. The first process may be sequentially performed for each of rearranged MPM. In addition, a second candidate group belonging to a first group of the non-MPM may be rearranged in an ascending order. A rearranged second candidate group may be compared with a mode value obtained through the first process. As a result of the comparison, when a mode value is greater than or equal to a second candidate group, a second process which adds 1 to a mode value may be performed. The second process may be sequentially performed for each of the rearranged second candidate group. A decoding device may set a mode value obtained through the first process and second process as an intra prediction mode of a current block.

Alternatively, a decoding device may generate one list by combining a candidate mode list and a first group of the non-MPM. The generated list may be configured with intra prediction modes including the MPM and the second candidate group and may be rearranged in an ascending order. A rearranged intra prediction mode may be compared with remaining mode information. As a result of the comparison, when remaining mode information is greater than or equal to a rearranged intra prediction mode, a process which adds 1 to remaining mode information may be performed. The process may be sequentially performed for each of rearranged intra prediction modes. A decoding device may set a mode value obtained through the process as an intra prediction mode of a current block.

In an example, it is assumed that the number of a second candidate group is 5 and a second candidate group is positioned before a third candidate group.

When the remaining mode information has a value of 0 to 4, a decoding device may determine an intra prediction mode corresponding to a value of remaining mode information among a second candidate group. The determined intra prediction mode may be set as an intra prediction mode of a current block.

On the other hand, when the remaining mode information has a value of 5 to 60, a decoding device may rearrange the MPM of a candidate mode list in an ascending order. The rearranged MPM may be compared with remaining mode information. As a result of the comparison, when remaining mode information is greater than or equal to the MPM, a first process which adds 1 to remaining mode information may be performed. The first process may be sequentially performed for each of rearranged MPM. In addition, a second candidate group belonging to a first group of the non-MPM may be rearranged in an ascending order. A rearranged second candidate group may be compared with a mode value obtained through the first process. As a result of the comparison, when a mode value is greater than or equal to a second candidate group, a second process which adds 1 to a mode value may be performed. The second process may be sequentially performed for each of the rearranged second candidate group. A decoding device may set a mode value obtained through the first process and second process as an intra prediction mode of a current block.

Alternatively, a decoding device may generate one list by combining a candidate mode list and a first group of the non-MPM. The generated list may be configured with intra prediction modes including the MPM and the second candidate group and may be rearranged in an ascending order. A rearranged intra prediction mode may be compared with remaining mode information. As a result of the comparison, when remaining mode information is greater than or equal to a rearranged intra prediction mode, a process which adds 1 to remaining mode information may be performed. The process may be sequentially performed for each of rearranged intra prediction modes. A decoding device may set a mode value obtained through the process as an intra prediction mode of a current block.

Illustrative methods of the present disclosure are represented as motion series for clarity of description, but it is not to limit an order that a stage is performed and if necessary, each stage may be performed simultaneously or in a different order. To implement a method according to the present disclosure, other stage may be additionally included in an illustrative stage, or remaining stages may be included except for some stages, or an additional other stage may be included except for some stages.

A variety of embodiments of the present disclosure do not enumerate all possible combinations, but are to describe the representative aspect of the present disclosure and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

The present disclosure may be used for encoding/decoding a video signal.

What is claimed is:

1. A video decoding method, comprising:
   obtaining a flag from a bitstream, the flag indicating whether an intra prediction mode of a current block is derived from a first candidate group;
   determining a candidate group for the intra prediction mode of the current block among a plurality of candidate groups based on the flag;
   deriving the intra prediction mode of the current block based on the determined candidate group; and
   performing intra prediction for the current block based on the derived intra prediction mode and a reference region,
   wherein the plurality of the candidate groups includes the first candidate group, a second candidate group and a third candidate group,
   wherein the first candidate group is configured with only one default mode,
   wherein the second candidate group is configured by using an intra prediction mode of a neighboring block adjacent to the current block,
   wherein the third candidate group is configured with remaining modes except for candidate modes of the first candidate group and the second candidate group among intra prediction modes available for the current block,
   wherein the default mode is representative of one of a DC mode or a Planar mode,
   wherein the default mode belonging to the first candidate group is not included in the second candidate group,
   wherein in response to a mode value of the derived intra prediction mode being less than a mode value of the DC mode, one reference line of the reference region is available for the intra prediction of the current block, and
   wherein in response to a mode value of the derived intra prediction mode being greater than a mode value of the DC mode, three reference lines of the reference region are available for the intra prediction of the current block.

2. The method of claim 1, wherein at least one candidate mode belonging to the second candidate group is derived by adding or subtracting a value of N to or from the intra prediction mode of the neighboring block, and
   wherein the value of N is a natural number greater than or equal to 2.

3. The method of claim 2, wherein a number of candidate modes belonging to the second candidate group is 5.

4. A video encoding method, comprising:
   determining an intra prediction mode of a current block; and
   performing intra prediction for the current block based on the intra prediction mode of the current block and a reference region,
   wherein the intra prediction mode of the current block belongs to a candidate group among a plurality of candidate groups,
   wherein the plurality of the candidate groups includes a first candidate group, a second candidate group and a third candidate group,
   wherein a flag indicating whether the intra prediction mode of the current block is derived from the first candidate group is encoded into a bitstream,
   wherein the first candidate group is configured with only one default mode,
   wherein the second candidate group is configured by using an intra prediction mode of a neighboring block adjacent to the current block,
   wherein the third candidate group is configured with remaining modes except for candidate modes of the first candidate group and the second candidate group among intra prediction modes available for the current block,
   wherein the default mode is representative of one of a DC mode or a Planar mode,
   wherein the default mode belonging to the first candidate group is not included in the second candidate group,
   wherein in response to a mode value of the intra prediction m(de being less than a mode value of the DC mode, one reference line of the reference region is available for the intra prediction of the current block, and
   wherein in response to mode value of the inta prediction mode being greater than a mode value of the DC mode, three reference lines of the reference region are available for the intra prediction of the current block.

5. The method of claim 4, wherein at least one candidate mode belonging to the second candidate group is derived by adding or subtracting a value of N to or from the intra prediction mode of the neighboring block, and
   wherein the value of N is a natural number greater than or equal to 2.

6. The method of claim 5, wherein a number of candidate modes belonging to the second candidate group is 5.

7. A non-transitory computer-readable recording medium storing bitstream generated by an encoding method, the method comprising:
   determining an intra prediction mode of a current block; and
   performing intra prediction for the current block based on the intra prediction mode of the current block and a reference region,
   wherein the intra prediction mode of the current block belongs to a candidate group among a plurality of candidate groups,
   wherein the plurality of the candidate groups includes a first candidate group, a second candidate group and a third candidate group,
   wherein a flag indicating whether the intra prediction mode of the current block is derived from the first candidate group is encoded into the bitstream,
   wherein the first candidate group is configured with only one default mode,
   wherein the second candidate group is configured by using an intra prediction mode of a neighboring block adjacent to the current block,
   wherein the third candidate group is configure with remaining modes except for candidate modes of the first candidate group and the second candidate group among intra prediction modes available for the current block,
   wherein the default mode is representative of one of a DC mode or a Planar mode,
   wherein the default mode belonging to the first candidate group is not included in the second candidate group,
   wherein in response to a mode value of the intra prediction mode being less than a mode value of the DC mode, one reference line of the reference region is available for the intra prediction of the current block, and wherein in response to a mode value of the intra prediction mode being greater than a mode value of the DC mode, three reference lines of the reference region are available for the intra prediction of the current block.

8. The non-transitory computer-readable recording medium of claim 7, wherein at least one candidate mode belonging to the second candidate group is derived by adding or subtracting a value of N to or from the intra prediction mode of the neighboring block, and wherein the value of N is a natural number greater than or equal to 2.

9. The non-transitory computer-readable recording medium of claim 8, wherein a number of candidate modes belonging to the second candidate group is 5.

10. The method of claim 1, wherein the third candidate group includes first remaining modes to which an index in a range of 0 to 2 is assigned and second remaining modes to which an index in a range other than 0 to 2 is assigned, wherein a number of bits allocated to remaining mode information for the first remaining modes is 5, and wherein a cumber of bits allocated to remaining mode information for the second remaining modes is 6.

\* \* \* \* \*